United States Patent
Bercovich et al.

(10) Patent No.: US 10,958,657 B2
(45) Date of Patent: Mar. 23, 2021

(54) UTILIZING TRANSPORT LAYER SECURITY (TLS) FINGERPRINTS TO DETERMINE AGENTS AND OPERATING SYSTEMS

(71) Applicant: PAYPAL, INC., San Jose, CA (US)

(72) Inventors: Yuval Arie Bercovich, Yavneh (IL); Ido Kantor, Gevat (IL); Maayan Liat Zohar, Santa Clara, CA (US); Elad Bichman, Ganey Tikva (IL); Zahid Nasiruddin Shaikh, Fremont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/452,118

(22) Filed: Jun. 25, 2019

(65) Prior Publication Data
US 2019/0319957 A1  Oct. 17, 2019

Related U.S. Application Data

(63) Continuation of application No. 15/260,158, filed on Sep. 8, 2016, now Pat. No. 10,356,101.
(Continued)

(51) Int. Cl.
| | |
|---|---|
| *H04L 29/06* | (2006.01) |
| *G06N 7/00* | (2006.01) |
| *G06F 16/22* | (2019.01) |
| *G06F 16/9535* | (2019.01) |
| *H04W 12/06* | (2021.01) |
| *G06F 21/31* | (2013.01) |

(Continued)

(52) U.S. Cl.
CPC ............ *H04L 63/101* (2013.01); *G06F 16/22* (2019.01); *G06F 16/9535* (2019.01); *G06F 21/00* (2013.01); *G06F 21/316* (2013.01); *G06F 21/44* (2013.01); *G06N 7/005* (2013.01); *H04L 63/10* (2013.01); *H04L 63/1425* (2013.01); *H04L 63/1441* (2013.01); *H04L 63/166* (2013.01); *H04W 12/06* (2013.01)

(58) Field of Classification Search
CPC ....... H04L 63/00; H04L 63/10; H04L 63/101; H04L 63/102; H04L 63/14; H04L 63/1408; H04L 63/1416; H04L 63/1441; H04L 63/1483; H04L 63/166; G06N 7/005
See application file for complete search history.

(56) References Cited

U.S. PATENT DOCUMENTS

| | | |
|---|---|---|
| 7,430,537 B2 | 9/2008 | Templeton et al. |
| 7,814,542 B1 | 10/2010 | Day |
| (Continued) | | |

OTHER PUBLICATIONS

M. Majkowski, "SSL fingerprinting for p0f" [Online], Jun. 2012 [Retrieved: Jul. 22, 2020], Retrieved from: < https://idea.popcount.org/2012-06-17-ssl-fingerprinting-for-p0f/ (Year: 2012).*
(Continued)

*Primary Examiner* — Eric W Shepperd
(74) *Attorney, Agent, or Firm* — Haynes and Boone LLP

(57) ABSTRACT

A computer system receives a first information detailing a TLS fingerprint. A computer system determines an amount of bad transactions associated with the TLS fingerprint, wherein a bad transaction is a transaction involved in one or more fraudulent activities. The computer system determines whether the amount of bad transactions associated with the TLS fingerprint exceeds a threshold amount.

20 Claims, 7 Drawing Sheets

Related U.S. Application Data

(60) Provisional application No. 62/375,806, filed on Aug. 16, 2016.

(51) Int. Cl.
*G06F 21/44* (2013.01)
*G06F 21/00* (2013.01)

(56) References Cited

U.S. PATENT DOCUMENTS

| | | | | |
|---|---|---|---|---|
| 8,285,813 | B1* | 10/2012 | Colton | G06F 9/54 |
| | | | | 709/217 |
| 8,286,241 | B1* | 10/2012 | Yeo | H04L 63/101 |
| | | | | 726/22 |
| 8,528,061 | B1 | 9/2013 | Davis | |
| 9,560,072 | B1 | 1/2017 | Xu | |
| 9,692,830 | B2 | 6/2017 | Heller et al. | |
| 10,171,495 | B1* | 1/2019 | Bowen | G06N 7/005 |
| 2007/0143847 | A1 | 6/2007 | Kraemer et al. | |
| 2010/0064372 | A1 | 3/2010 | More et al. | |
| 2011/0035805 | A1 | 2/2011 | Barkan et al. | |
| 2012/0174217 | A1 | 7/2012 | Ormazabal | |
| 2012/0210421 | A1 | 8/2012 | Ormazabal et al. | |
| 2012/0210423 | A1 | 8/2012 | Friedrichs et al. | |
| 2012/0311027 | A1* | 12/2012 | Salusky | H04L 63/126 |
| | | | | 709/203 |
| 2013/0055357 | A1 | 2/2013 | Etchegoyen | |
| 2015/0006384 | A1* | 1/2015 | Shaikh | G06Q 20/4016 |
| | | | | 705/44 |
| 2015/0020196 | A1 | 1/2015 | Wijbrans et al. | |
| 2015/0026027 | A1 | 1/2015 | Priess et al. | |
| 2015/0045021 | A1 | 2/2015 | Schlatter et al. | |
| 2015/0170147 | A1 | 6/2015 | Geckle et al. | |
| 2015/0188886 | A1 | 7/2015 | Mityagin | |
| 2015/0295926 | A1 | 10/2015 | Husain et al. | |
| 2015/0350244 | A1* | 12/2015 | Gehrig | H04L 63/1416 |
| | | | | 726/23 |
| 2016/0057158 | A1* | 2/2016 | Kumar | H04L 63/0281 |
| | | | | 726/23 |
| 2016/0134646 | A1 | 5/2016 | Wing et al. | |
| 2016/0155128 | A1 | 6/2016 | Desai et al. | |
| 2016/0350355 | A1* | 12/2016 | Zhu | G06F 16/2365 |
| 2016/0350400 | A1 | 12/2016 | Zhu et al. | |
| 2016/0359823 | A1 | 12/2016 | Ayyadevara et al. | |
| 2017/0163422 | A1* | 6/2017 | Chatterjee | H04L 65/80 |
| 2017/0163678 | A1 | 6/2017 | Kern et al. | |
| 2017/0329968 | A1 | 11/2017 | Wachdorf et al. | |
| 2018/0054468 | A1* | 2/2018 | Whynot | H04L 65/105 |

OTHER PUBLICATIONS

Husak et al. "Network-based HTTPS Client Identification Using SSL/TLS Fingerprinting" [Online], Oct. 10, 2015 [Retrieved on: Aug. 31, 2018], www.ieee.org, 10th Int. Conf. on Availability, Reliability and Security, Retrieved from: < https://ieeexplore.ieee.org/stamp/stamp.jsp?tp=&arnumber=7299941 > (Year: 2015).

Korczynski et al. "Markov Chain Fingerprinting to Classify Encrypted Traffic" [Online], 2014 [Retreived: Aug. 31, 2018], www.ieee.org, Retrieved from: <http://citeseerx.ist.psu.edu/viewdoc/download;jsessionid=228D744CAAB7CDC7573860BEB5F94115?doi=10.1.1.712.3002&rep=rep1 &type=pdf > (Year: 2014).

Square Lemon, "TLS Fingerprinting Smarter Defending & Stealthier Attacking" [Online], Sep. 25, 2015 [Retrieved on: Aug. 31, 2018], blog.squarelemon.com, Retrieved from:< https://blog.squarelemon.com/tls-fingerprinting/ > (Year: 2015).

\* cited by examiner

UTILIZING TRANSPORT LAYER SECURITY (TLS) FINGERPRINTS TO DETERMINE AGENTS AND OPERATING SYSTEMS

CROSS-REFERENCE TO RELATED APPLICATIONS

This continuation application claims priority to and the benefit of U.S. patent application Ser. No. 15/260,158 filed Sep. 8, 2016, which is a Non-Provisional Application claiming priority to Provisional Patent Application No. 62/375,806 filed Aug. 16, 2016.

TECHNICAL FIELD

The present disclosure relates generally to transport layer security (TLS) fingerprints, and more particularly to utilizing TLS fingerprints to detect the agent and operating system being used by a user.

BACKGROUND

TLS provides security in the form of encryption to all manner of network connections from legitimate financial transactions, to private conversations. The inability for an eavesdropper to analyze this encrypted traffic protects its users. Those using TLS operate under the assumption that although an eavesdropper can easily observe the existence of their session, the content itself is secure and unreadable without access to cryptographic keying material at one or both ends of the connection.

Furthermore, by capturing the elements of a client hello packet, which remain static from session to session for each client, it is possible to build a fingerprint (TLS fingerprint).

DETAILED DESCRIPTION

Embodiments of the present disclosure provide a system, method, and program product for determining a predicted agent based on comparing a TLS fingerprint to a model. A computer system may receive, from a first set of computing devices, a first information. The computer system may create a model based on the first information, wherein the model correlates one or more TLS fingerprints to one or more agents. The computer system may receive a second information includes a TLS fingerprint and a declared agent. The computer system may determine a predicted agent based on comparing the TLS fingerprint included in the second information to the model. The computer system may determine whether the predicted agent matches the declared agent included in the second information.

Embodiments of the present disclosure will now be described in detail with reference to the accompanying Figures.

Figure 1:
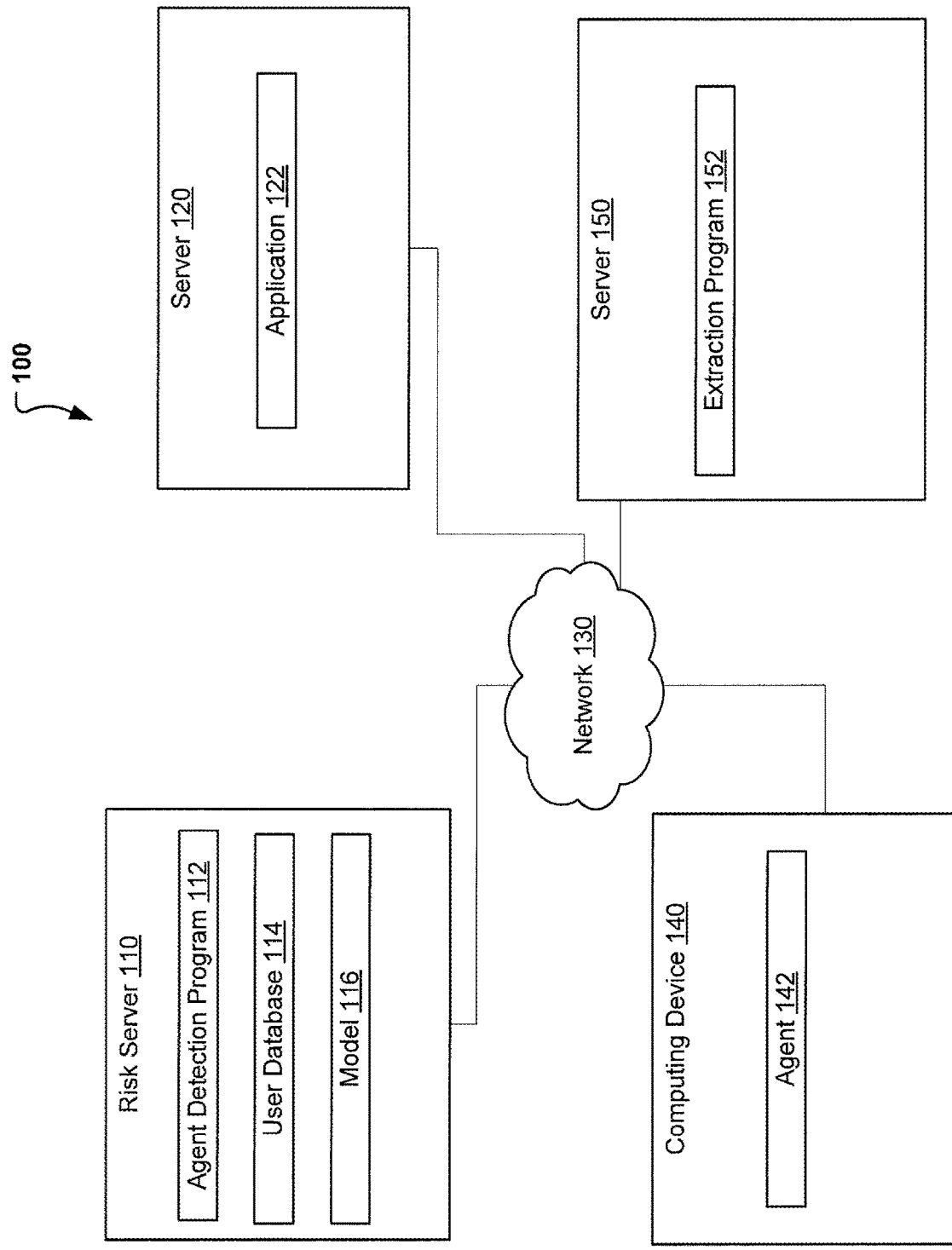
FIG. 1 illustrates an agent detection system, in accordance with an embodiment.

FIG. 1 illustrates agent detection system 100, in accordance with an embodiment. In an example embodiment, agent detection system 100 includes risk server 110, server 120, computing device 140, and server 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between risk server 110, server 120, server 150, and computing device 140.

Server 120 includes application 122. Server 120 may be a desktop computer, a laptop computer, a tablet computer, a handheld device, a smart-phone, a thin client, or any other electronic device or computing system capable of receiving and sending data to and from other computing devices, such as computing device 140, via network 130. Although not shown, optionally, server 120 can comprise a cluster of servers executing the same software to collectively process requests as distributed by a front end server and a load balancer. Server 120 is described in more detail with reference to FIG. 7.

Application 122 is a collection of files including, for example, hypertext markup language (HTML) files, Cascading Style Sheets (CSS) files, image files and JavaScript files. Application 122 may also include other resources such as audio files and video files. In one embodiment, application 122 maybe a website.

Computing device 140 includes agent 142. Computing device 140 may be a desktop computer, a laptop computer, a tablet computer, a handheld device, a smart-phone, a thin client, or any other electronic device or computing system capable of receiving and sending data to and from other computing devices, such as server 120, via network 130. Computing device 140 is described in more detail with reference to FIG. 7.

Agent 142 is a program that enables users to view, watch, or listen to documents and other resources, such as audio and video files, retrieved from a network device. In an exemplary embodiment, agent 142 requests documents and other resources from server 120 via network 130. Agent 142 transmits requests to server 120 for documents and/or resources contained in application 122. Server 120 responds to the requests by retrieving the documents and resources from application 122, and transmitting them back to agent 142 via network 130. In an exemplary embodiment, documents and resources retrieved by agent 142 are viewed by a user of computing device 140 on a display device. In one embodiment, agent 142 may be a web browser. In other embodiments, agent 142 may alternatively be an application, such as an application on a mobile device, or an alternative software program capable of transmitting and receiving documents and other resources from other computing devices, such as server 120, and enabling users to view, watch, or listen to the received documents and/or resources.

Server 150 includes extraction program 152. In the example embodiment, server 150 is a computing device capable of receiving and sending data to and from other computing devices, such as computing device 140, via a network, such as network 130. For example, a server 150 may be a desktop computer, a laptop computer, a tablet computer, a handheld device, a smart-phone, a thin client, or any other electronic device or computing system capable of receiving and sending data to and from other computing devices. Although not shown, optionally, server 150 can comprise a cluster of servers executing the same software to collectively process requests as distributed by a front end server and a load balancer. In the example embodiment, server 150 includes an element (or resource) that is displayed on application 122. In addition, extraction program 152 is a program capable of extracting information such as a TLS fingerprint from a received "client hello" packet, and information detailing a declared agent and declared operating system from within a "user agent string" located in a received packet. Server 150 is described in more detail with reference to FIG. 7.

Risk server 110 includes agent detection program 112, user database 114, and model 116. In the example embodiment, risk server 110 is a computing device capable of receiving and sending data to and from other computing devices, such as computing device 140, via a network, such as network 130. For example, a risk server 110 may be a desktop computer, a laptop computer, a tablet computer, a handheld device, a smart-phone, a thin client, or any other electronic device or computing system capable of receiving and sending data to and from other computing devices. Although not shown, optionally, risk server 110 can comprise a cluster of servers executing the same software to collectively process requests as distributed by a front end server and a load balancer. Risk server 110 is described in more detail with reference to FIG. 7.

In the example embodiment, user database 114 is a database containing entries detailing each transaction or each instance of communication between agent detection program 112 and other computing devices. Furthermore, in the example embodiment, each entry of user database 114 includes information detailing a TLS fingerprint, a declared operating system and a declared agent. In other embodiments, user database 114 may include information detailing an operating system family corresponding to each TLS fingerprint, internet protocol (IP) address information corresponding to each TLS fingerprint, and additional network information. Furthermore, user database 114 may additionally store information detailing whether a transaction (entry) was a "bad transaction" based on whether there was any fraudulent activity reported with regard to the transaction.

In the example embodiment, the information contained in user database 114 is used to create model 116. Model 116 includes information correlating specific TLS fingerprints to specific operating systems, specific agents, or both. In other embodiments, model 116 may also include information correlating specific TLS fingerprints to specific operating system families. Furthermore, model 116 is capable of receiving input, such as a TLS fingerprint, and outputting a predicted operating system and/or agent. Alternatively, model 116 is capable of receiving input, such as a TLS fingerprint, and outputting a probability distribution over a set of classes.

In the example embodiment, agent detection program 112 is a program capable of analyzing communication information received from server 150, such as extracted information detailing a TLS fingerprint, an agent, and an operating system. Furthermore, agent detection program 112 is a program capable of storing the extracted information in a database, such as user database 114, and further categorizing the information within user database 114 based on TLS fingerprints. In additional embodiments, agent detection program 112 may also be capable of creating a model, such as model 116, based on the information within user database 114. Further, in the example embodiment, agent detection program 112 is capable of utilizing the information within user database 114 in order to determine a probability that an operating system declared as being used in association with a detected TLS fingerprint is actually the operating system that is being used. In addition, agent detection program 112 is capable of determining a probability that an agent or application declared as being used in association with a detected TLS fingerprint is actually the agent or application that is being used. Further, agent detection program 112 is capable of determining a probability that an agent and operating system that is declared as being used in association with a detected TLS fingerprint is actually the agent and operating system that is being used.

Additionally, in the example embodiment, agent detection program 112 is capable of determining whether a detected TLS fingerprint is associated with one or more bad transactions, and further determine a rating detailing how correlated the detected TLS fingerprint is with "bad transactions". Agent detection program 112 is also capable of determining whether a TLS fingerprint should be placed on a "black list" or a "white list". Agent detection program 112 is described in further detail below with reference to FIGS. 2, 3, 4, and 6.

Figure 2:
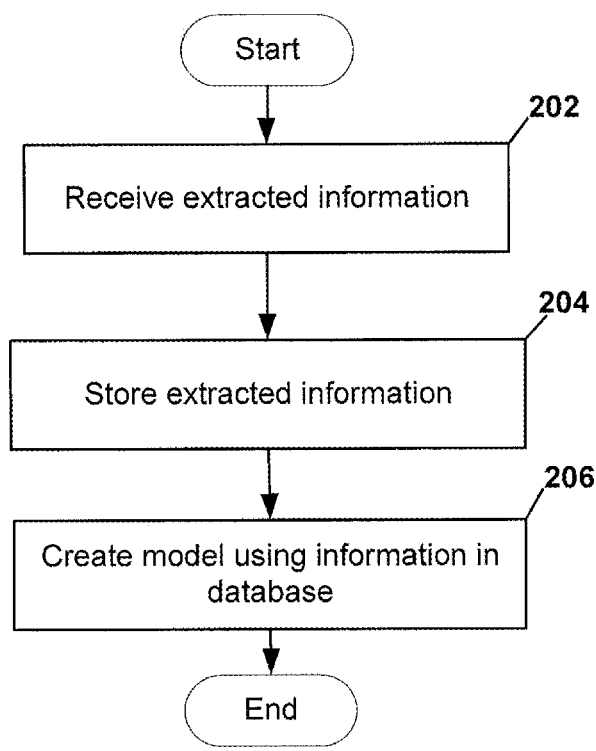
FIG. 2 is a flowchart illustrating the operations of the agent detection program of FIG. 1 in utilizing a TLS fingerprint and declared operating system (OS) agent and operating system information to create a model, in accordance with an embodiment.

FIG. 2 is a flowchart illustrating the operations of agent detection program 112 in utilizing a TLS fingerprint and declared agent and operating system information to create a model, i.e., model 116, that is capable of predicting an operating system and/or agent that corresponds to a given TLS fingerprint, in accordance with an embodiment.

In the example embodiment, when a user accesses an application, for example a website, the page may contain an element (or resource) that resides on an alternative server, such as server 150. When an agent on the user device accesses the element or resource on the alternative server, a communication is initiated, for example, a "client hello" packet is transmitted to the server that contains information with regard to IP, transmission control protocol (TCP), and TLS communication with the server (and server application). Specifically, the "client hello" packet may include IP information, and additional information which may be combined to form a TLS fingerprint. Furthermore, additional packets may be sent, such as a packet containing a "user agent string" (referred to herein as a "user agent string packet") which may include a declared operating system, a declared agent (such as a type of web browser). However, information contained in the "user agent string", which includes the declared operating system and declared agent, may be falsified by the user. A TLS fingerprint has a high correlation with an operating system and agent being used by the user, and in many cases, is unique to specific operating systems and agents. Therefore, a model correlating TLS fingerprints to specific operating systems, agents, or both, can be utilized in predicting an actual operating system being used, an actual agent being used, or both, for a given TLS fingerprint. The following flowchart discussion details how the information contained in the "client hello" and "user agent string" packet may be utilized by the risk server to develop a model and further utilize that model to identify the accuracy of "declared" information present in future received packets.

In the example embodiment, a user utilizes agent 142 to access application 122 via network 130. As stated above, application 122 contains an element that resides on an alternative server, server 150. Therefore, agent 142 communicates with server 150 in order to access the element. Within this communication, extraction program 152 on server 150, receives a "client hello" and "user agent string" packet from agent 142 via network 130. In the example embodiment, as stated above, the "client hello" and "user agent string" packets include information detailing a TLS fingerprint, a declared operating system, a declared agent (such as a type of web browser), IP information, and additional information needed to establish secure communication with server 150.

Extraction program 152 extracts the TLS fingerprint and IP information from the "client hello" packet, and the declared operating system, the declared agent from the "user agent string" packet. Agent detection program 112 receives the extracted information from extraction program 152 on server 150 via network 130 (step 202). In one embodiment, extraction program 152 may receive a request (from risk server 110 or another computing device) to verify the extracted declared agent, declared operating system, or both, and based on the request, may transmit the extracted information to agent detection program 112 via network 130. Agent detection program 112 categorizes and stores the extracted information in user database 114 (step 204). In the example embodiment, agent detection program 112 categorizes or groups the extracted information based on the TLS fingerprint. For example, if the TLS fingerprint associated with the extracted information matches another TLS fingerprint stored in user database 114, agent detection program 112 groups the two database entries together. In other embodiments, agent detection program 112 may not categorize the information stored in user database 114.

Agent detection program 112 creates a model from the information stored in user database 114 (step 206). In the example embodiment, agent detection program 112 utilizes the information stored in user database 114 to create model 116 which correlates specific TLS fingerprints to specific operating systems and specific agents. For example, agent detection program 112 may categorize the entries within user database 114 based on the TLS fingerprint. Agent detection program 112 may then build model 116 so that, with regard to each TLS fingerprint, probabilities for a set of specific operating systems, a set of agents, or both may be determined. In the example embodiment, model 116 utilizes machine learning techniques and the Naïve Bayes algorithm in order to determine the probabilities for the set of specific operating systems, set of predicted agents, or both. In general, in machine learning, simple probabilistic classifiers may be developed by applying the Naïve Bayes theorem to a group of data. In other words, given an input, model 116 may output a probability distribution over a set of classes. For example, if user database 114 contains 100 entries associated with TLS fingerprint 1 with 99 of the entries declaring OS1 as the operating system and 1 entry declaring OS2 as the operating system, model 116 may output a probability of 99% for the OS1 (class) and a probability of 1% for the OS2 (class). Therefore, in the example embodiment, model 116 is able to accept an input, such as a TLS fingerprint, and output probabilities that the TLS fingerprint corresponds to a set of operating systems, agents, or both. In other embodiments, model 116 may be able to accept an input, such as TLS fingerprint, and output a predicted operating system, agent, or both (based on machine learning techniques as described above). Referring to the example above, if user database 114 contains 100 entries associated with TLS fingerprint 1 with 99 of the entries declaring OS1 as the operating system and 1 entry declaring OS2 as the operating system, model 116 may output a predicted operating system of OS1.

While in the example embodiment, agent 142 is utilized to access application 122, in other embodiments, another agent (such as a mobile application) may be utilized, and furthermore, application 122 may be a mobile application web service.

Figure 3:
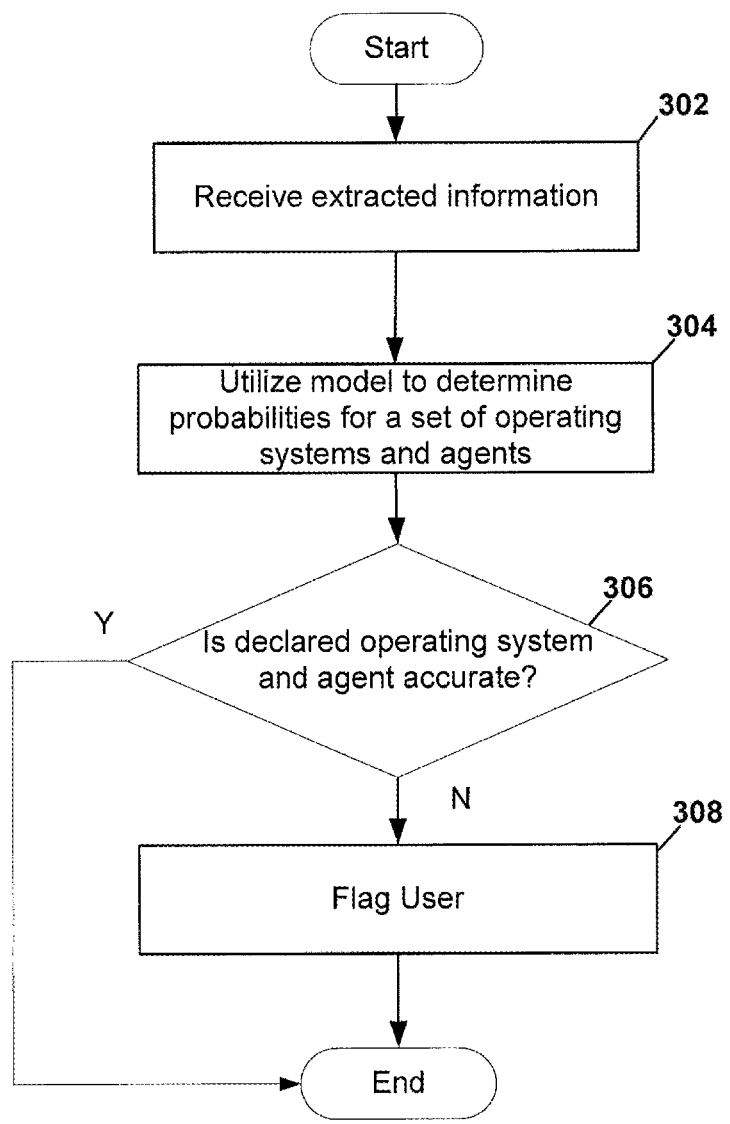
FIG. 3 is a flowchart illustrating the operations of the agent detection program of FIG. 1 in utilizing the model to identify potential fraudulent activity, in accordance with an embodiment.

FIG. 3 is a flowchart illustrating the operations of agent detection program 112 in utilizing model 116 to identify potential fraudulent activity, in accordance with an embodiment.

In the example embodiment, a user utilizes an agent to access application 122 via network 130. As stated above, application 122 may contain an element that resides on an alternative server, server 150. Therefore, the user agent communicates with server 150 in order to access the element. Within this communication, extraction program 152, on server 150, receives a "client hello" and "user agent string" packet from the user agent via network 130. In the example embodiment, as stated above, the "client hello" and "user agent string" packets include information detailing a TLS fingerprint, a declared operating system, a declared agent (such as a type of web browser), IP information, and additional information needed to establish secure communication with server 150.

Extraction program 152 extracts the TLS fingerprint and IP information from the "client hello" packet, and extracts the declared operating system, the declared agent from the "user agent string" packet. Agent detection program 112 receives the extracted information from extraction program 152 on server 150 via network 130 (step 302). In one embodiment, extraction program 152 may receive a request (from risk server 110 or another computing device) to verify the extracted declared agent, declared operating system, or both, and based on the request, may transmit the extracted information to agent detection program 112 via network 130. Agent detection program 112 then inputs the extracted TLS fingerprint into model 116 in order to determine probabilities associated with each member of a set of operating systems, agents, or both (step 304). As stated above, model 116 is able to accept an input, such as a TLS fingerprint, and output a probability that the TLS fingerprint corresponds to each member of a set of operating systems, agents, or both.

Agent detection program 112 determines whether the operating system and agent with the highest associated probability matches the declared operating system and agent contained in the "user agent string" packet (decision 306). If agent detection program 112 determines that the operating system and agent with the highest associated probability does match the declared operating system and agent contained in the "user agent string" packet (decision 306, "YES" branch), agent detection program 112 does not flag the user and receives the next set of extracted information. If agent detection program 112 determines that the operating system and agent with the highest probability does not match the declared operating system and agent contained in the "user agent string" packet (decision 306, "NO" branch), agent detection program 112 flags the user (step 308). In the example embodiment, agent detection program 112 may flag the IP address associated with the user. In addition, along with flagging the IP address associated with the user, agent detection program 112 may block the transaction, block communication from the IP address to application 122, display a captcha on the user agent, ask a security question, and/or transmit a short message service (SMS) for the purposes of verification. Furthermore, agent detection program 112 may transmit all the information (TLS fingerprint, IP information, declared operating system and agent information, and probabilities information) to a risk management group for further evaluation.

In other embodiments, agent detection program 112 may determine whether either the operating system with the highest probability or the agent with the highest probability matches the declared operating system or the declared agent contained in the "user agent string" packet. If agent detection program 112 determines either the operating system with the highest probability or the agent with the highest probability does not match the declared operating system or the declared agent, agent detection program 112 flags the user as described above, and may additionally perform the steps listed above, such as transmitting all information to a risk management group for further evaluation.

In even further embodiments, agent detection program 112 may determine whether the agent with the highest probability matches the declared agent in the "user agent string" packet. If agent detection program 112 determines that the agent with the highest probability does not match the declared agent, agent detection program 112 flags the user as described above. If agent detection program 112 determines that the agent with the highest probability matches the declared agent in the "user agent string" packet, agent detection program 112 determines whether the operating system with the highest probability matches the declared operating system. If agent detection program 112 determines that the operating system with the highest probability does not match the declared operating system, agent detection program 112 flags the user as described above.

In another embodiment, as stated above, model 116 may output a predicted operating system and/or agent based on machine learning techniques, as described above. In this embodiment, agent detection program 112 determines whether the predicted operating system and agent matches the declared operating system and agent contained in the "user agent string" packet. If agent detection program 112 determines that the predicted operating system and agent output by model 116 matches the declared operating system and agent contained in the "user agent string" packet, agent detection program 112 does not flag the user and receives the next set of extracted information. If agent detection program 112 determines that the predicted operating system and agent output by model 116 do not match the declared operating system and agent contained in the "user agent string" packet, agent detection program 112 flags the user and may additionally perform the steps listed above. In the example embodiment, agent detection program 112 may flag the IP address associated with the user. Furthermore, agent detection program 112 may transmit all the information (TLS fingerprint, IP information, declared/predicted mismatch information) to a risk management group for further evaluation.

Figure 4:
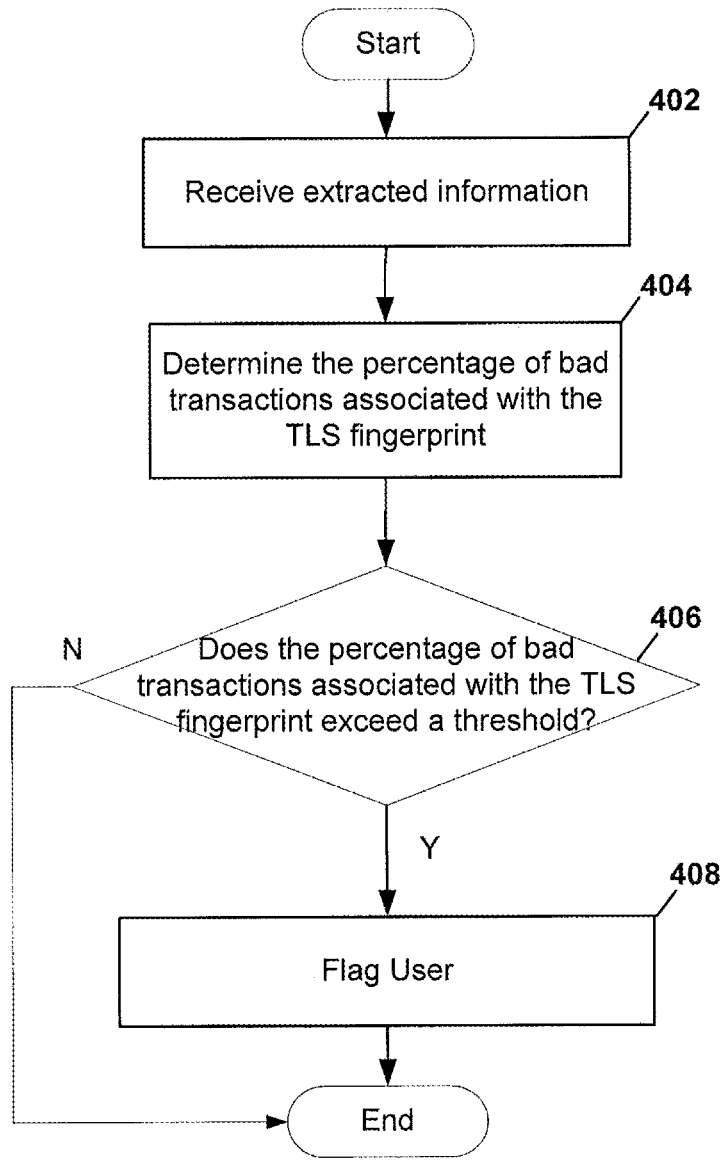
FIG. 4 is a flowchart illustrating the operations of the agent detection program of FIG. 1 in utilizing the model in order to identify agents being utilized for fraudulent activity, in accordance with an embodiment.

FIG. 4 is a flowchart illustrating the operations of agent detection program 112 in utilizing model 116 to identify agents being utilized for fraudulent activity, in accordance with an embodiment. As stated above a user, or a person attempting to commit fraud may, in some cases, declare an agent and/or operating system that is not the actual agent or operating system that is being used. Rather the user may create his or her own custom agent or program. Since, as stated above, there is a high correlation between a TLS fingerprint and the operating system and agent utilized by the user, if a user uses his or her own custom agent, the corresponding TLS fingerprint may be unique to the custom agent. Furthermore, if the user uses the custom agent to perform fraudulent transactions, then a large percentage of transactions associated with the TLS fingerprint may be tagged as being part of fraudulent activity ("bad transactions"). Therefore, it may be possible to identify when a user, who is potentially involved in fraud, accesses a website using a custom agent by analyzing the corresponding TLS fingerprint. In the example embodiment, a "bad transaction" refers to a transaction that is tagged or otherwise identified as being fraudulent or associated with fraud.

In the example embodiment, a user utilizes an agent to access application 122 via network 130. As stated above, application 122 may contain an element that resides on an alternative server, server 150. Therefore, the user agent communicates with server 150 in order to access the element. Within this communication, extraction program 152, on server 150, receives a "client hello" and "user agent string" packet from the user agent via network 130. In the example embodiment, as stated above, the "client hello" and "user agent string" packets include information detailing a TLS fingerprint, a declared operating system, a declared agent (such as a type of web browser), IP information, and additional information needed to establish secure communication with server 150.

Extraction program 152 extracts the TLS fingerprint and IP information from the "client hello" packet, and the declared operating system, the declared agent from the "user agent string" packet. Agent detection program 112 receives the extracted information from extraction program 152 on server 150 via network 130 (step 402). In one embodiment, extraction program 152 may receive a request (from risk server 110 or another computing device) to verify whether the extracted TLS fingerprint is associated with a fraudulent agent (i.e.—the TLS fingerprint does not correspond to a large percentage or amount of fraudulent transactions), and based on the request, may transmit the extracted information to agent detection program 112 via network 130. Additionally, agent detection program 112 may store the extracted information in user database 114.

Agent detection program 112 references user database 114 in order to determine the number of "bad transactions" and the number of total transactions associated with the extracted TLS fingerprint. With this information, agent detection program 112 determines the percentage of "bad transactions" associated with the TLS fingerprint (step 404). As stated above, user database 114 may additionally include information detailing whether a transaction (or entry in user database 114) is associated with any fraudulent activity and is therefore a "bad transaction". In the example embodiment, the information regarding whether a transaction is associated with fraudulent activity is received from customers or targets of the fraudulent activity. For example, if a company receives customer complaints regarding a transaction due to an account being hacked or credit card information being stolen, the company may flag the entry within user database 114 corresponding to the transaction in order to serve as a notification that the transaction was a "bad transaction". In other embodiments, the information regarding whether a transaction is associated with fraudulent activity may be obtained by agent detection program 112 identifying similarities between a transaction and other transactions known to be associated with fraudulent activity. For example, agent detection program 112 may determine whether one or more patterns in a transaction match one or more patterns present in a transaction known to be associated with fraudulent activity. In another example, agent detection program 112 may determine whether one or more patterns in a transactions are substantially similar (such as have a similarity index that exceeds a threshold value) to one or more patterns present in a transaction known to be associated with fraudulent activity. In one embodiment, "bad transactions" may be maintained in a separate database (with all transactions being maintained in user database 114).

Agent detection program 112 determines whether the percentage of "bad transactions" associated with the TLS fingerprint exceeds a threshold percentage (decision 406). In the example embodiment, the threshold percentage is 25%, however, in other embodiments, the threshold percentage may be a different number. If agent detection program 112 determines that the percentage of "bad transactions" associated with the TLS fingerprint does not exceed the threshold percentage (decision 406, "NO" branch), agent detection program 112 does not flag and the user and receives the set of extracted information. If agent detection program 112 determines that the percentage of "bad transactions" associated with the TLS fingerprint exceeds the threshold percentage (decision 406, "YES" branch), agent detection program 112 flags the user (step 408). In the example embodiment, flagging the user may include flagging the TLS fingerprint along with the IP address. In another embodiment, flagging the user may include flagging the TLS fingerprint. In the example embodiment, flagging the TLS fingerprint includes providing an indication that the TLS fingerprint is to be processed further. Alternatively, flagging the TLS fingerprint may include providing an indication that agent detection program 112 needs to monitor future transactions to determine if they are associated with the TLS fingerprint. Furthermore, agent detection program 112 may transmit all the information (TLS fingerprint, IP information, declared/predicted mismatch information) to a risk management group for further evaluation. In other embodiments, agent detection program 112 may block the IP address of the user from communicating with server 120, display a captcha on the user agent, ask a security question, and/or transmit a SMS for the purposes of verification. Additionally, in one embodiment, flagging the TLS fingerprint may include monitoring for the TLS fingerprint and, if detected, blocking the user associated with the TLS fingerprint from communicating with server 120. In one embodiment, responsive to flagging the user or flagging the TLS fingerprint, agent detection program 112 does one or more of: flagging an IP address associated with the TLS fingerprint, blocking communication with the IP address associated with the TLS fingerprint, blocking a transaction associated with the TLS fingerprint, and transmitting information associated with the TLS fingerprint to a risk management group.

In further embodiments, a developer may input certain TLS fingerprints associated with "bad agents" into user database 114 and model 116. In these further embodiments, if agent detection program 112 determines that an extracted TLS fingerprint is associated with a "bad agent", agent detection program 112 may flag the user and transmit all information associated with the user to a risk management group for further evaluation, as described above.

In an additional embodiment, agent detection program 112 may determine whether an amount (such as a numerical amount) of "bad transactions" associated with the TLS fingerprint exceeds a threshold amount. If agent detection program 112 determines that the amount of "bad transactions" associated with the TLS fingerprint does not exceed the threshold percentage, agent detection program 112 does not flag and the user and receives the set of extracted information. If agent detection program 112 determines that the amount of "bad transactions" associated with the TLS fingerprint exceeds the threshold amount, agent detection program 112 flags the user, in a similar manner as described above.

Figure 5:
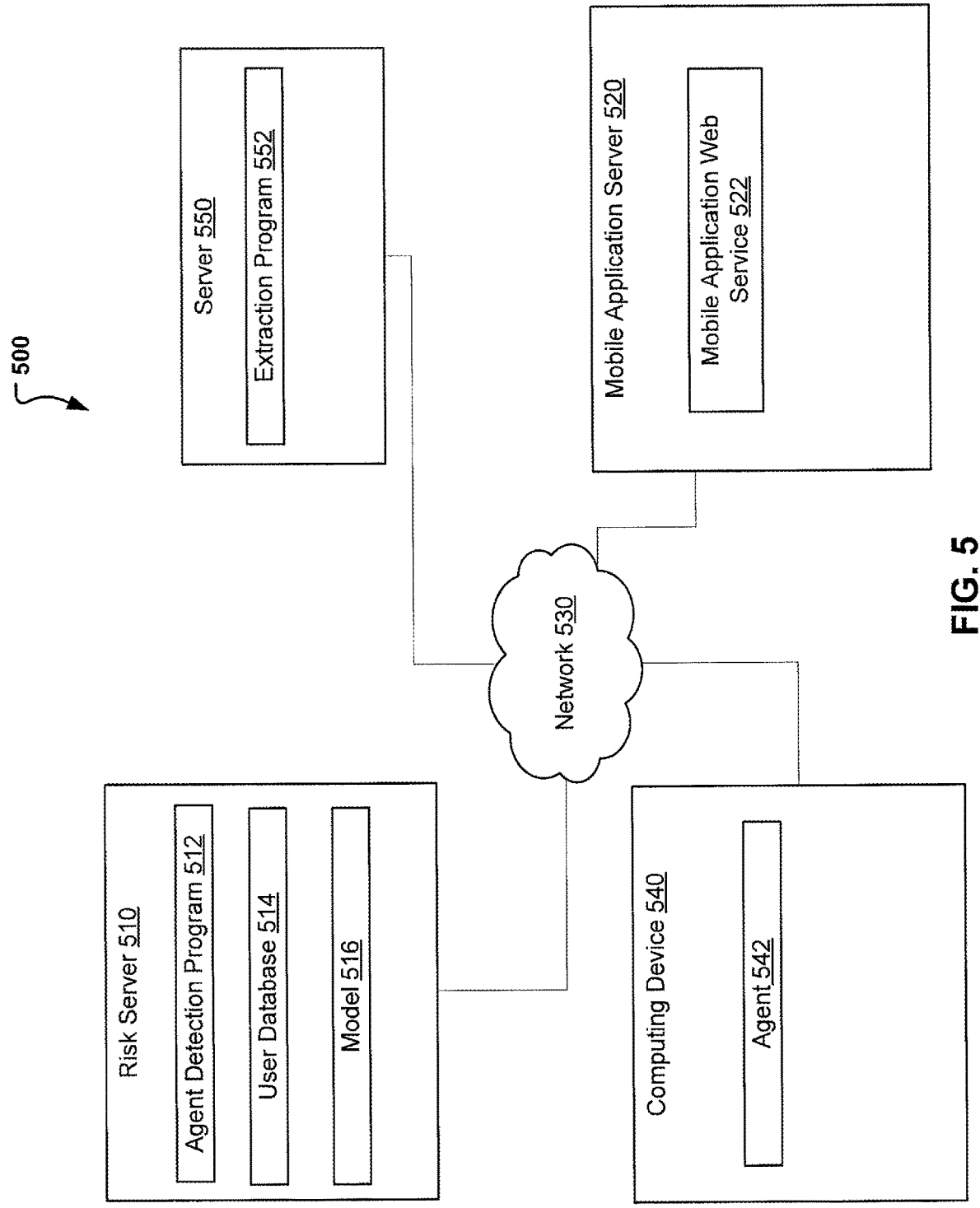
FIG. 5 illustrates an additional embodiment of the agent detection system, in accordance with an embodiment.

FIG. 5 illustrates agent detection system 500, in accordance with an embodiment. In an example embodiment, agent detection system 500 includes risk server 510, mobile application server 520, computing device 540, and server 550 interconnected via network 530.

In the example embodiment, network 530 is the Internet, representing a worldwide collection of networks and gateways to support communications between devices connected to the Internet. Network 530 may include, for example, wired, wireless or fiber optic connections. In other embodiments, network 530 may be implemented as an intranet, a local area network (LAN), or a wide area network (WAN). In general, network 530 can be any combination of connections and protocols that will support communications between risk server 510, mobile application server 520, computing device 540, and server 550.

Mobile application server 520 includes mobile application web service 522. Mobile application server 520 may be a desktop computer, a notebook, a laptop computer, a tablet computer, a handheld device, a smart-phone, a thin client, or any other electronic device or computing system capable of receiving and sending data to and from other computing devices, such as computing device 540, via network 530. Although not shown, optionally, mobile application server 520 can comprise a cluster of servers executing the same software to collectively process requests as distributed by a front end server and a load balancer. In the example embodiment, mobile application server 520 is configured to process requests received from mobile devices. Mobile application server 520 is described in more detail with reference to FIG. 7.

Mobile application web service 522 is a collection of files including, for example, hypertext markup language (HTML) files, Cascading Style Sheets (CSS) files, image files and JavaScript files. Mobile application web service 522 may also include other resources such as audio files and video files. In the example embodiment, mobile application web service 522 is capable of receiving requests and transmitting information to a mobile application client.

Computing device 540 includes agent 542. Computing device 540 may be a desktop computer, a notebook, a laptop computer, a tablet computer, a handheld device, a smart-phone, a thin client, or any other electronic device or computing system capable of receiving and sending data to and from other computing devices, such as mobile application server 520, via network 530. Computing device 540 is described in more detail with reference to FIG. 7.

Agent 542 is a program that enables users to view, watch, or listen to documents and other resources, such as audio and video files, retrieved from a network device. In an exemplary embodiment, agent 542 requests documents and other resources from mobile application server 520 via network 530. Agent 542 transmits requests to mobile application server 520 for documents and/or resources contained in mobile application web service 522. Mobile application server 520 responds to the requests by retrieving the documents and resources from mobile application web service 522, and transmitting them back to agent 542 via network 530. In an exemplary embodiment, documents and resources retrieved by agent 542 are viewed by a user of computing device 540 on a display device.

Server 550 includes extraction program 552. In the example embodiment, server 550 is a computing device capable of receiving and sending data to and from other computing devices, such as computing device 540, via a network, such as network 530. For example, a server 550 may include a tablet computer, a smart watch, smart glasses, a handheld device, a smart-phone, a thin client, or an alternative portable device. In the example embodiment, server 550 includes an element (or resource) that is displayed on mobile application web service 522. In addition, extraction program 552 is a program capable of extracting information such as a TLS fingerprint from a received "client hello" packet, and information detailing a declared agent and declared operating system from within a "user agent string" located in a received packet. Server 550 is described in more detail with reference to FIG. 7.

Risk server 510 includes agent detection program 512, user database 514, and model 516. In the example embodiment, Risk server 510 is a computing device capable of receiving and sending data to and from other computing devices, such as computing device 540, via a network, such as network 530. For example, risk server 510 may include a tablet computer, a smart watch, smart glasses, a handheld device, a smart-phone, a thin client, or an alternative portable device. Risk server 510 is described in more detail with reference to FIG. 7.

In the example embodiment, user database 514 is a database containing entries detailing each transaction or each instance of communication between agent detection program 512 and other computing devices. Furthermore, in the example embodiment, each entry of user database 514 includes information detailing a TLS fingerprint, a declared operating system and a declared agent. In other embodiments, user database 514 may include information detailing an operating system family corresponding to each TLS fingerprint, IP address information corresponding to each TLS fingerprint, and additional network information. Furthermore, user database 514 may additionally store information detailing whether a transaction (entry) was a "bad transaction" based on whether there was any fraudulent activity reported with regard to the transaction.

In the example embodiment, the information contained in user database 514 is used to create model 516. Model 516 includes information correlating specific TLS fingerprints to specific operating systems, specific agents, or both. In other embodiments, model 516 may also include information correlating specific TLS fingerprints to specific operating system families. Furthermore, model 516 is capable of receiving input, such as a TLS fingerprint, and outputting a predicted operating system and/or agent. Alternatively, model 516 is capable of receiving input, such as a TLS fingerprint, and outputting a probability distribution over a set of classes.

In the example embodiment, agent detection program 512 is a program capable of analyzing communication information received from computing device 540 and extracting information detailing a TLS fingerprint, an agent, and an operating system. Furthermore, agent detection program 512 is a program capable of storing the extracted information in a database, such as user database 514, and further categorizing the information within user database 514 based on TLS fingerprint. In additional embodiments, agent detection program 512 may also be capable of creating a model, such as model 516, based on the information within user database 514. Further, in the example embodiment, agent detection program 512 is capable of utilizing the information within user database 514 in order to determine a probability that an operating system declared as being used in association with a detected TLS fingerprint is actually the operating system that is being used. In addition, agent detection program 512 is capable of determining a probability that an agent or application declared as being used in associated with a detected TLS fingerprint is actually the agent or application that is being used. Further, agent detection program 512 is capable of determining a probability that an agent and operating system that is declared as being used in association with a detected TLS fingerprint is actually the agent and operating system that is being used.

Additionally, in the example embodiment, agent detection program 512 is capable of determining whether a detected TLS fingerprint is associated with one or more bad transactions, and further determine a rating detailing how correlated the detected TLS fingerprint is with "bad transactions". Agent detection program 512 is also capable of determining whether a TLS fingerprint should be placed on a "black list" or a "white list". Agent detection program 512 is described in further detail below with reference to FIG. 6.

Figure 6:
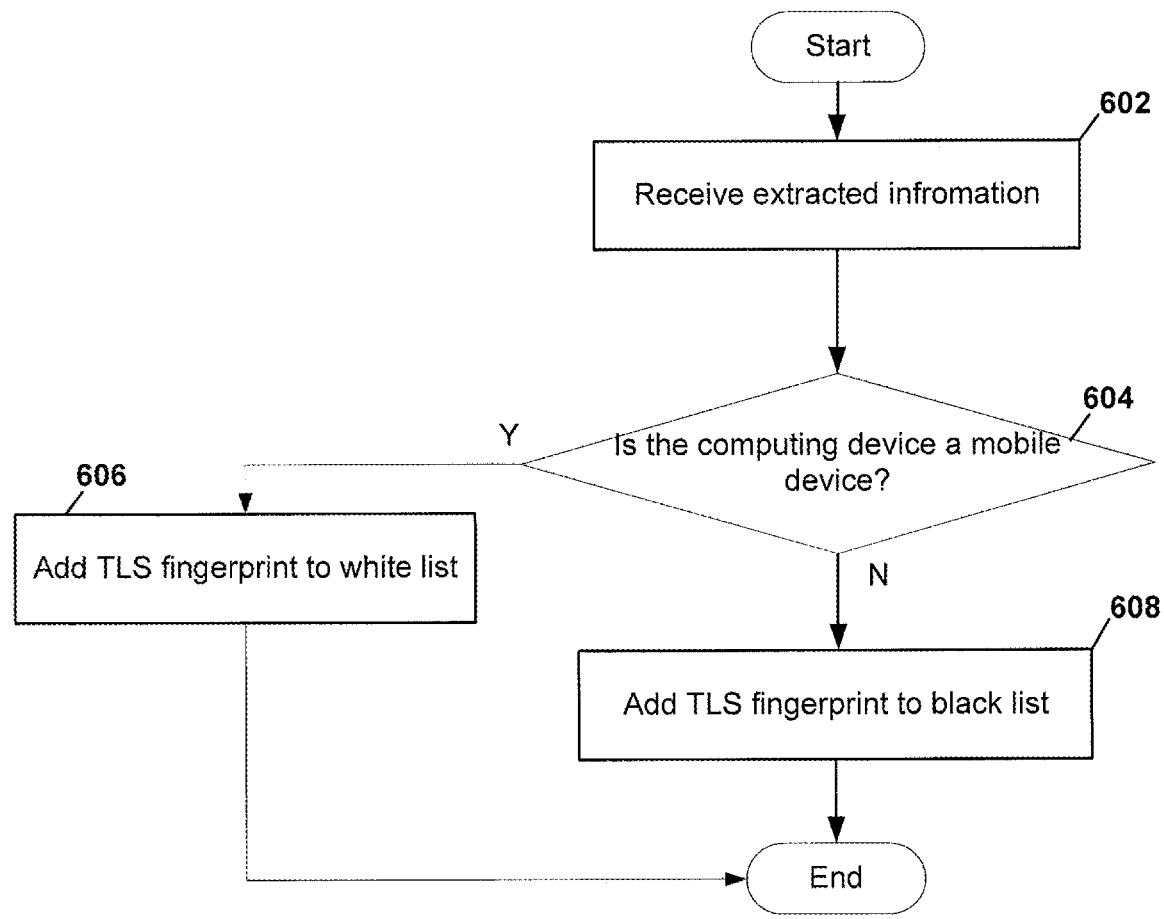
FIG. 6 is a flowchart illustrating the operations of the agent detection program of FIG. 1 in determining whether a TLS fingerprint is associated with a mobile device and based on the determination adding the TLS fingerprint to a blacklist or a whitelist, in accordance with an embodiment.

FIG. 6 is a flowchart illustrating the operations of agent detection program 512 in determining whether a TLS fingerprint is associated with a mobile device and based on the determination, adding the TLS fingerprint to a blacklist or a whitelist, in accordance with an embodiment. In the example embodiment, since mobile application server 520 supports a mobile application web service, mobile application web service 522, which is only to be accessed by applications on mobile devices, agent detection program 512 may utilize an extracted TLS fingerprint in order to determine whether a computing device attempting to access mobile application web service 522 is a mobile device.

In the example embodiment, the user of computing device 540 utilizes agent 542 to access mobile application web service 522 via network 530. Mobile application web service 522 may contain an element that resides on an alternative server, server 550. Therefore, agent 542 communicates with server 550 in order to access the element. Within this communication, extraction program 552, on server 550, receives a "client hello" packet and a "user agent string" packet from agent 542 via network 530. In the example embodiment, as stated above, the "client hello" and "user agent string" packets includes information detailing a TLS fingerprint, a declared operating system, a declared agent (such as a type of web browser), IP information, and additional information needed to establish secure communication with server 550.

Extraction program 552 extracts the TLS fingerprint and IP information from the "client hello" packet, and the declared operating system and the declared agent from the "user agent string" packet. Agent detection program 512 receives the extracted information from extraction program 552 on server 550 via network 530 (step 602). In one embodiment, extraction program 552 may receive a request (from risk server 510 or another computing device) to verify the extracted declared agent, declared operating system, or both, and based on the request, may transmit the extracted information to agent detection program 512 via network 530. For example, verifying a declared operating system may include determining whether a TLS fingerprint associated with the declared operating system corresponds to a mobile device. Alternatively, extraction program 552 may detect a mobile application related request from agent 542 (such as a request from a mobile application to access mobile application web service 522), and based on detected the request, may transmit the extracted information to agent detection program 512 via network 530. Agent detection program 512 then inputs the extracted TLS fingerprint into model 516 in order to determine probabilities associated with each member of a set of operating systems, agents, or both. As stated above, model 516 is able to accept an input, such as a TLS fingerprint, and output a probability that the TLS fingerprint corresponds to each member of a set of operating systems, agents, or both. In other embodiments, model 516 may output a predicted operating system, agent, or both.

Agent detection program 512 determines whether computing device 540 is a mobile device (decision 604). In the example embodiment, agent detection program 512 determines whether computing device 540 is a mobile device by determining whether the operating system with the highest associated probability is associated with a mobile device. In other words, agent detection program 512 determines whether the operating system is an operating system that is compatible with a mobile device. Agent detection program 512 may reference a list of operating systems that are associated with mobile devices in order to make this determination. In other embodiments, agent detection program 512 may determine whether computing device 540 is a mobile device by determining whether the agent with the highest associated probability is associated with a mobile device.

If agent detection program 512 determines that computing device 540 is a mobile device (decision 604, "YES" branch), agent detection program 512 adds the extracted TLS fingerprint to a "white list" which indicates that the TLS fingerprint is associated with a mobile device (step 606). If agent detection program 512 determines that computing device 540 is not associated with a mobile device (decision 604, "NO" branch), agent detection program 512 adds the extracted TLS fingerprint to a "black list" which indicates that the TLS fingerprint is associated with a non-mobile device, and therefore, is not allowed to communicate with mobile application web service 522 (step 608). Furthermore, agent detection program 512 may take additional steps to block communication between agent 542 on computing device 540 and mobile application web service 522. In addition, if agent detection program 512 receives a TLS fingerprint in the future, agent detection program 512 may cross-reference the TLS fingerprint against the blacklist, and if agent detection 512 determines the TLS fingerprint is on the black list, may block communication as described above. In other embodiments, this process discussed in FIG. 6 may be applied to a non-mobile device environment.

In another embodiment, a developer or administrator of risk server 510 may create a "black list" based on historical data or known TLS fingerprints of malicious agents. Agent detection program 512 may then cross-reference any future TLS fingerprints that attempt to access mobile application web service 522 against the "black list". If the cross-referenced TLS fingerprint matches a TLS fingerprint on the "black list", agent detection program 512 flags the TLS fingerprint and may also block communication in a similar manner as described above. In the example embodiment, the "black list" may be applied to a mobile or a non-mobile environment.

Additionally, a developer or administrator of risk server 510 may create a "white list" based on historical data or known fingerprints associated with allowable devices or agents. For example, for agent detection system 500, where mobile application web service 522 is only to be accessed by applications on mobile devices, a developer or administrator of risk sever 510 may create a "white list" containing known fingerprints that correspond to mobile devices. In one embodiment, agent detection system 500 may refer to model 516 in determining whether a TLS fingerprint is associated with a mobile device, for example, based on determining whether the operating system (or agent) with the highest associated probability is associated with a mobile device. Agent detection program 512 may then cross-reference any future TLS fingerprints that attempt to access mobile application web service 522 against the "white list". If the cross-referenced TLS fingerprint matches a TLS fingerprint on the "white list", agent detection program 512 allows the transaction or communication. If the cross-referenced TLS fingerprint does not match a TLS fingerprint on the "white list", agent detection program 512 flags the TLS fingerprint and may also block communication in a similar manner as described above.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 7:
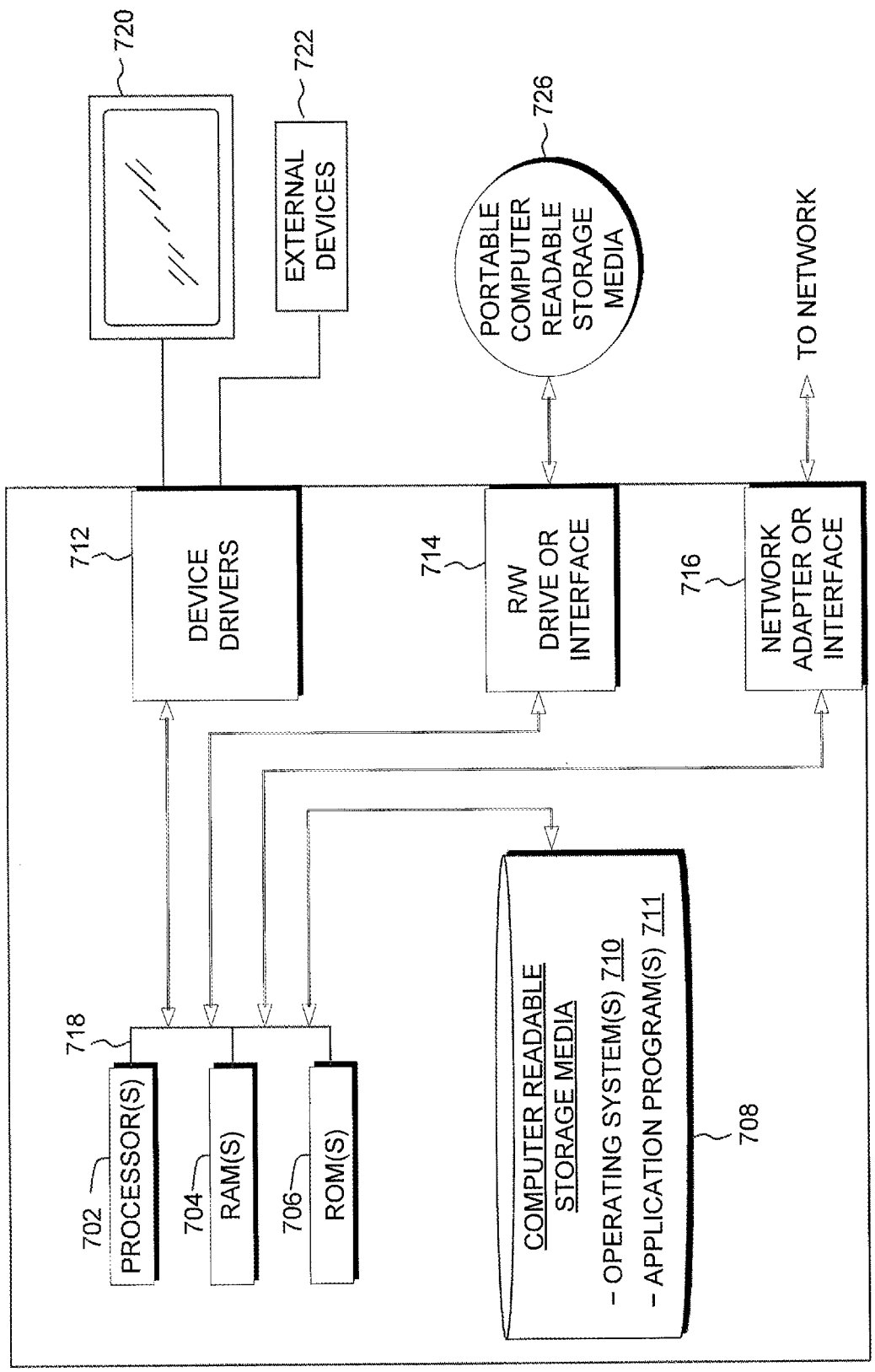
FIG. 7 is a block diagram depicting the hardware components of the agent detection system of FIG. 1 and FIG. 5, in accordance with an embodiment.

FIG. 7 depicts a block diagram of components of computing devices contained in agent detection system 100 of FIG. 1 and agent detection system 500 of FIG. 5, in accordance with an embodiment of the present disclosure. It should be appreciated that FIG. 7 provides only an illustration of one implementation and does not imply any limitations with regard to the environments in which different embodiments may be implemented. Many modifications to the depicted environment may be made.

Computing devices may include one or more processors 702, one or more computer-readable random-access memories (RAMS) 704, one or more computer-readable read-only memories (ROMs) 706, one or more computer readable storage media 708, device drivers 712, read/write drive or interface 714, network adapter or interface 716, all interconnected over a communications fabric 718. Communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, agent detection program 112, are stored on one or more of the computer readable storage media 708 for execution by one or more of the processors 702 via one or more of the respective RAMs 704 (which typically include cache memory). In the illustrated embodiment, each of the computer readable storage media 708 may be a magnetic disk storage device of an internal hard drive, compact disc read-only memory (CD-ROM), digital video disc (DVD), memory stick, magnetic tape, magnetic disk, optical disk, a semiconductor storage device such as RAM, ROM, erasable programmable read-only memory (EPROM), flash memory or any other computer-readable tangible storage device that can store a computer program and digital information.

Computing devices may also include a R/W drive or interface 714 to read from and write to one or more portable computer readable storage media 726. Application programs 711 on the computing devices may be stored on one or more of the portable computer readable storage media 726, read via the respective R/W drive or interface 714 and loaded into the respective computer readable storage media 708.

Computing devices may also include a network adapter or interface 716, such as a TCP/IP adapter card or wireless communication adapter (such as a 4G wireless communication adapter using OFDMA technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

Computing devices may also include a network adapter or interface 716, such as a transmission control protocol/Internet protocol (TCP/IP) adapter card or wireless communication adapter (such as a 4G wireless communication adapter using orthogonal frequency-division multiple access (OFDMA) technology). Application programs 711 on the computing devices may be downloaded to the computing devices from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The results of a preliminary analysis of transactions received by a testing server in order to provide evidence for the correlation between a specific TLS fingerprint and a specific operating system and/or specific agent is described below. The testing server received 854,633 records for analysis, with each record containing information detailing a TLS fingerprint, an operating system family, an operating system name, and an agent. After using the Naïve Bayes theorem to analyze the information, using the TLS fingerprint, the model was able to predict the operating system family being used at a 98.8% accuracy rate. In addition, the model was able to predict the specific operating system being used at an 87.6% accuracy rate, and a 94.9% if Mac OS vs. iOS mislabeling issues are ignored ("Mac" is a trademark of Apple, Inc. and "iOS" is a trademark of Cisco Systems, Inc.). Furthermore, the model was able to predict the specific agent being used at a 90.6% accuracy rate, and a 98.4% accuracy rate if Mac OS vs. iOS mislabeling issues are ignored.

What is claimed is:

1. A system comprising:
a non-transitory memory; and
one or more hardware processors coupled to the non-transitory memory and configured to read instructions from the non-transitory memory to cause the system to perform operations comprising:
in response to detecting an access attempt for an application by an agent, receiving, over a network connection, an element request for the application, the element request including an element information packet associated with the application;
extracting element information from the element information packet, the extracting including detecting a transport layer security (TLS) fingerprint and a declared operating system;
determining probabilities for a plurality of operating systems;
determining whether the declared operating system corresponds to an operating system associated with the agent based on the probabilities; and
blocking a communication associated with the TLS fingerprint.

2. The system of claim 1, wherein the operations further comprise:
identifying, from the plurality of operating systems, a particular operating system with a highest associated probability; and
determining that the declared operating system does not correspond to the particular operating system.

3. The system of claim 1, wherein the operations further comprise transmitting the TLS fingerprint and the declared operating system to a risk management device.

4. The system of claim 1, wherein the blocking includes blocking a transaction from an IP address associated with the agent.

5. The system of claim 4, wherein the operations further comprise in response to blocking the transaction, transmitting an SMS message to a device for verification.

6. The system of claim 4, wherein the operations further comprise flagging the blocked transaction as fraudulent activity.

7. The system of claim 1, wherein the element information further includes an IP address.

8. A method comprising:
in response to detecting an access attempt for an application by an agent, receiving, over a network connection, an element request for the application, the element request including an element information packet associated with the application;
extracting element information from the element information packet, the extracting including detecting a transport layer security (TLS) fingerprint and a declared operating system;
determining probabilities for a plurality of operating systems;
determining whether the declared operating system corresponds to an operating system associated with the agent based on the probabilities; and
cancelling a transaction associated with the element request.

9. The method of claim 8, further comprising:
   identifying, from the plurality of operating systems, a particular operating system with a highest associated probability; and
   determining that the declared operating system does not correspond to the particular operating system.

10. The method of claim 8, further comprising transmitting the TLS fingerprint and the declared operating system.

11. The method of claim 8, further comprising blocking a communication from an IP address associated with the agent.

12. The method of claim 8, further comprising in response to determining that the declared operating system does not correspond to the operating system associated with the agent, transmitting an SMS message.

13. The method of claim 11, further comprising flagging the canceled transaction as fraudulent activity.

14. The method of claim 8, wherein the element information further includes IP information.

15. A non-transitory machine-readable medium having stored thereon machine-readable instructions executable to cause a machine to perform operations comprising:
   in response to detecting an access attempt for an application by an agent, receiving, over a network connection, an element request for the application, the element request including an element information packet;
   extracting element information from the element information packet, the extracting including detecting a transport layer security (TLS) fingerprint and a declared operating system;
   determining probabilities for a plurality of operating systems;
   determining whether the declared operating system corresponds to an operating system associated with the agent based on the probabilities determined; and
   cancelling a transaction associated with the element request.

16. The non-transitory machine-readable medium of claim 15, wherein the operations further comprise evaluating a risk associated with the element request based on transmitting the TLS fingerprint and the declared operating system.

17. The non-transitory machine-readable medium of claim 15, wherein the operations further comprise blocking a communication from an IP address associated with the agent.

18. The non-transitory machine-readable medium of claim 17, wherein the operations further comprise in response to determining that the declared operating system does not correspond to the operating system associated with the agent, transmitting an SMS message to a device.

19. The non-transitory machine-readable medium of claim 17, wherein the canceled transaction is flagged as fraudulent activity.

20. The non-transitory machine-readable medium of claim 15, wherein the element information further includes IP information.

\* \* \* \* \*